Inventor
Guy A. Dunn
By Lyon & Lyon
Attorneys

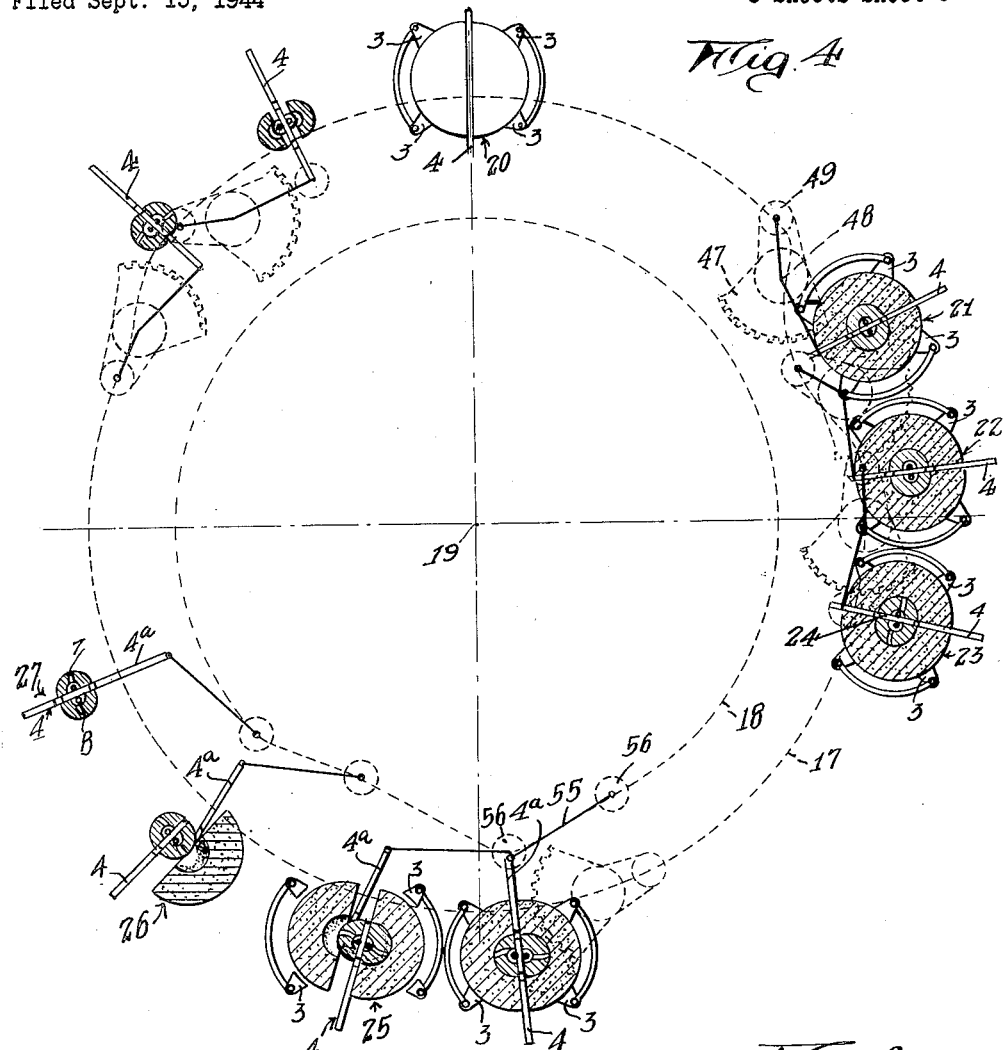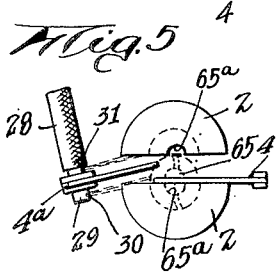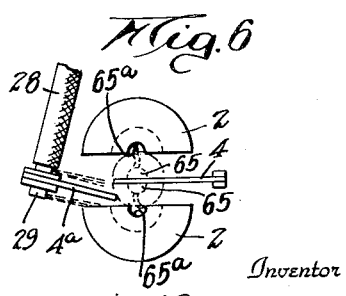

Patented Nov. 14, 1950

2,529,727

UNITED STATES PATENT OFFICE 2,529,727

SEEDING APPARATUS

Guy A. Dunn, Oakland, Calif., assignor to California Packing Corporation, San Francisco, Calif., a corporation of New York Application September 15, 1944, Serial No. 554,316

7 Claims. (Cl. 146—40)

This invention relates to seeding apparatus and more particularly to an apparatus adapted for seeding, pitting or coring fruit to separate the seed cores or pits from previously halved fruit.

In the preparation of fruit for canning, it is common practice to remove the peeling therefrom, halve the fruit and remove the seed or seed-carrying pods, pits, or stones therefrom. It has been found that in these operations the seed pod or core containing the seeds, pits or stones after they have been cut from the fruit halves do not readily separate from the halved fruit necessitating the inspection of the halved fruit prior to canning to be sure that the severed seed pods, pits or stones are all removed from the seed pod cavities formed in the fruit.

This invention relates to an improvement in the seed pod removing means of the pear preparation machine of the type disclosed in my co-pending application, Serial No. 462,699, filed October 20, 1942, for Pear preparation method and means, which became Patent No. 2,429,346 on October 21, 1947, but is not limited in its applicability to incorporation in such a machine.

It is an object of this invention to provide a seed coring, pitting or stoning apparatus in which means are provided for cutting core cavities in the fruit halves around the seed pods, stones, pits or cores thereof and for retaining the severed portions of the fruit and separating the halves of fruit from the severed portions while the severed portions are retained in position.

Another object of this invention is to provide a method of separating seed pods, pits or stones from previously halved fruit wherein the means utilized for cutting the seed pod, pit or stone cavities in the halves of the fruit is utilized for gripping and holding the said severed elements until after the fruit halves have been separated and discharged.

Other objects and advantages of this invention it is believed will be apparent from the following detailed description of a preferred embodiment thereof as illustrated in the accompanying drawings.

In the drawings:

Figure 4 is a diagrammatic plan view illustrating the cycle of operation of seeding or seed pod removing and separation of fruit halves from seed pod sections as carried out in the apparatus and as incorporating the method of my invention.

Figure 5 is a diagrammatic view illustrating the operation of separating one fruit half from the remainder of the fruit.

Figure 6 is a diagrammatic view illustrating the separation of the remaining fruit half while the seed pod core or pit sections are retained within the apparatus.

In the preferred embodiment of my invention as illustrated in the accompanying drawings I have illustrated my invention as adapted in a pear preparation machine utilized for the preparing of pears for canning. In this apparatus the fruit has been peeled prior to its transfer from the peeling apparatus over a splitting blade 1 by which the fruit 2 is cut into two halves including the seed pod for seed-carrying structure of the fruit.

Figure 1:
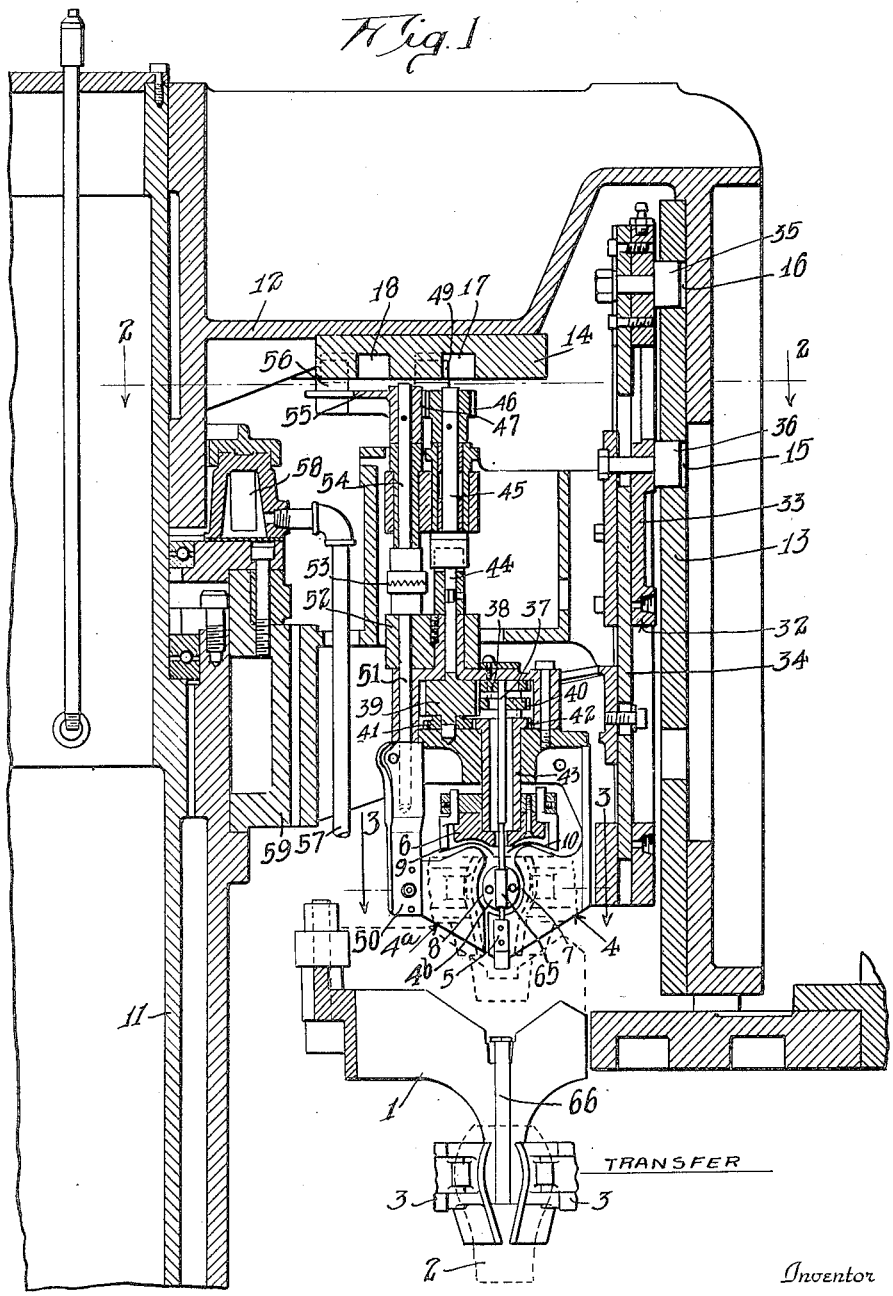
Figure 1 is a fragmental elevation of a fruit preparation machine illustrating in elevation principally in mid-section a fruit seeding apparatus embodying my invention.
Figure 2:
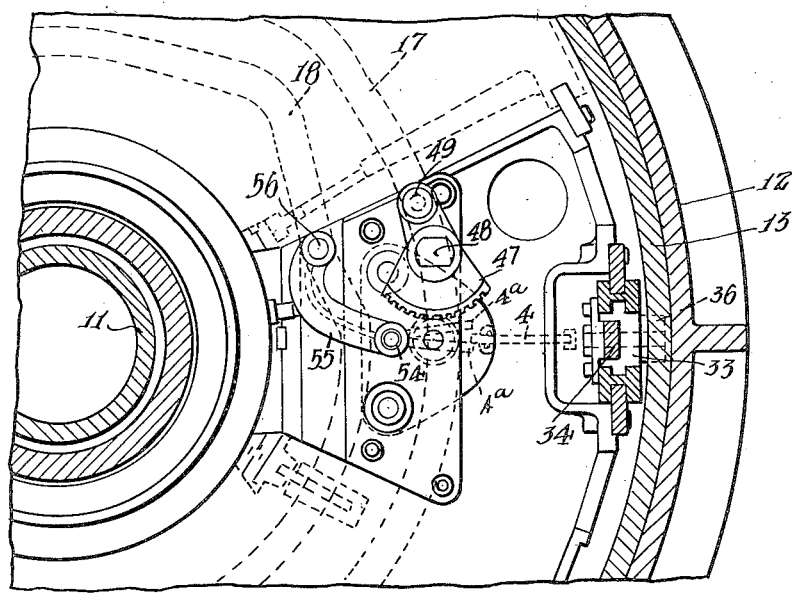
Figure 2 is a sectional end elevation taken substantially on the line 2—2 of Figure 1.

As set forth in my co-pending application above referred to, this transfer is carried out through the medium of clamps 3 which grip the fruit after the peeling operation has been performed and moves the fruit over the splitting blade 1. As the fruit is moved over the splitting blade 1, the splitting blade moves up to the position indicated in dotted lines in Figure 1 and the fruit is then transferred off from the splitting blade 1 onto a coring loop plate 4.

During the operations preceding the actual coring and shaping of the pear, the stem fibre has been removed to form a stem fibre hole which extends axially of the pear and this hole in this particular modification is used as the guiding means for guiding the fruit halves as they are gripped by the clamps 3 into the proper position on the coring loop plate 4.

On the coring loop plate 4 there is provided a cylindrical guide 5 which passes through this guide hole of the fruit 2 and the upper end of the pear is brought to rest against a stop plate 6 of the coring loop assembly in order to position the seed pods in proper relation to the seed pod or coring knives 7 and 8.

The structure as herein utilized for cutting the seed pod cavities in the two halves of the fruit including the means provided for operating the two coring knives 7 and 8 as well as for operating the trimming knives 9 and 10 is substantially identical to that illustrated in my co-pending application, Serial No. 462,699 hereinabove referred to.

As set forth in my co-pending application, the splitting blade 1 and the coring loop assembly are carried in a frame structure which is rotated around the central column 11 of the apparatus. At the upper end of this central column 11 there is provided a cover plate 12 which is also held stationary. Carried by this cover plate is a cam ring 13. Secured to the under face of the horizontal section of the plate 12 is a second cam ring 14. The cam ring 13 provides the cam grooves 15 and 16 which are utilized for operating the clamps 3 and for raising the clamp structure to transfer the pear from the peeling assembly over the splitting blade 1 and into position upon the coring loop plate 4.

The cam ring 14 is provided with cam grooves 17 and 18 which are operative in connection with the structure as will hereinafter be described for rotating the coring knives 7 and 8 and the trimming knives 9 and 10 for cutting the seed pod from the fruit halves and for trimming the fruit halves as they are supported and held upon the plate 4 by the clamps 3. The cam groove 18 provides the cam means which operates in conjunction with the operating structure hereinafter described which separates the two halves of the fruit from the structure of the seed pods which are cut from the halves and while these seed pod sections are held in position with relation to the plate 4 until after both halves of the fruit have been separated and discharged from the machine. Subsequently the seed pod sections are separately discharged from the machine at a point of further advancement of the coring loop assembly around the axis of the column 11 so that they may be separately discharged from the fruit halves so as not to be mixed therewith.

The general operation illustrated in Figure 4 gives the sequence of operation of the apparatus embodying my invention and shows the method thereof. In Figure 4 the center of the turret or column 11 is indicated at 19. At about the position 20 of the enclosed circle of operation illustrated as being carried on around the center 19 of the column 11 the fruit is lifted by the clamps 3 over the splitting blade 1 and is split into two halves. The clamps 3 continue to lift the pear over and onto the coring loop plate 4 at approximately the position indicated at 21.

During the interval of passing from position 21 to 22, the coring knives 7 and 8 have been rotated through 180° each to completely sever the sections of the seed pod from the fruit halves. However, at this time the fruit is still held with relation to the coring loop plate 4 by means of the clamps 3 and it is found in practice that releasing the clamps 3 did not insure that the fruit halves would fall away from the plate 4 or separate from the sections of the seed pod which had been cut therefrom so that it was necessary to hand pick the fruit to be sure there were no sections of the seed pod remaining. Therefore, in order to avoid this difficulty, and while the core loop plate 4 is traveling from the position 22 to the position 23, the coring knives 7 and 8 are rotated back through 90° so that they then lie in the position indicated at 24, that is, with their loop sections surrounding the seed pod sections which they have previously severed from the halves of the fruit, thereby locking these seed pod sections in position with relation to the coring loop assembly. The parts remain in this position, that is, with the clamps 3 holding the fruit halves upon the plate 4 and with the knives 7 and 8 locking the seed pod sections until the fruit is transferred to near the point where it is desired to discharge the fruit halves from the machine into the proper receiving chute or basket. At the time that the coring loop assembly reaches the desired point of discharge, the clamps 3 are released from contact with the fruit halves.

The core loop plate 4 is formed in two sections or has a movable portion 4ᵃ as will hereinafter be described which is now oscillated so as to bear successively against the halves of the pear previously released by the clamps so that the pear halves are successively gently displaced from their contact with the coring loop plates 4, breaking any suction or adherence which may be operating to hold the pears upon the core plate 4 and at the same time separating the halves from the locked seed pod sections held by the knives 7 and 8.

At position 25 I have indicated the clamps 3 as moved away from the fruit halves and the movement of the movable section 4ᵃ of the coring loop plate 4 to move one-half of the fruit away from the coring loop plate 4 and the retained seed pod section held in position by the coring knife 8. In position 26 I have indicated the movable section 4ᵃ of the plate 4 as oscillated in the opposite direction to move the other half of the fruit away from the plate 4 as its seed pod section is held with relation to the plate 4 by the coring knife 7.

The seed pod sections are retained in their position with relation to the plate 4 until after the coring loop assembly is passed further around the center and to a point of separate discharge of the seed pod sections, which may be in the position indicated at 27 or thereabouts, at which time the knives 7 and 8 are rotated through a further rotation of 90° back into the plane of the plate 4 whereby the seed pod sections fall away from the plate 4 and may be separately caught in a suitable refuse chute or basket as desired.

In order to keep the plates 4 and 4ᵃ clean and lubricated and to aid in the separation of the fruit halves and the seed pod sections therefrom I provide, as will hereinafter be specifically described, for the spraying of water on the exposed surfaces of the plates 4 and 4ᵃ during the operations of separation of the fruit halves and seed pod sections from the plates 4 and 4ᵃ.

Figure 3:
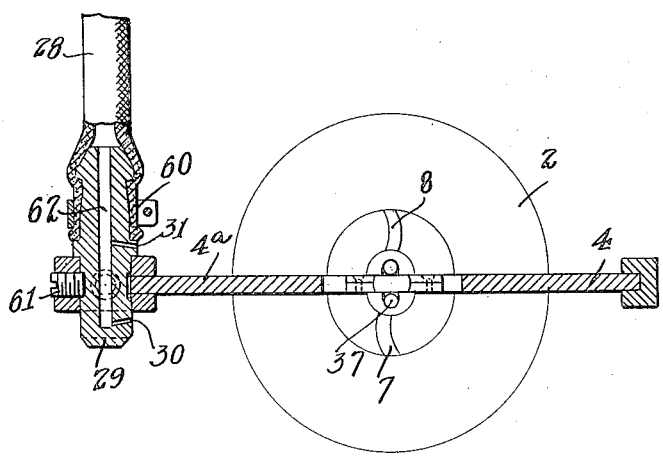
Figure 3 is a sectional end elevation taken substantially on the line 3—3 of Figure 1.

As indicated in Figures 3, 5 and 6, the water sprays are provided by connecting a water conduit 28 to the movable section 4ᵃ of the plate 4 and the connecting spindle 29 which passes through the movable plate section 4ᵃ is provided with jet apertures 30 and 31 lying upon opposite sides of the movable plate section 4ᵃ and inclined in a direction to deliver jets of water over the plates 4 and 4ᵃ to keep the same properly lubricated and clear of trimmings of the fruit halves and to aid in the separation of the two fruit halves and seed pod sections from the plates 4 and 4ᵃ.

The means for carrying out the operations as hereinabove specifically described may obviously be of many forms and for convenience I have herein illustrated the means as adapted to the type of machine of my aforesaid co-pending application, Serial No. 462,699.

In this illustration the clamps 3 are operated by means of the slide frame structure indicated at 32, which includes a slide frame 33 and an inner slide 34. The inner slide 34 is coupled with the individual clamps 3 so that when this slide is moved vertically as by the influence of its cam roller 35 riding in the cam groove 16 of the cam cylinder 13, the clamps are moved to and from open position as is more fully and in detail described in my co-pending application above referred to.

The slide frame 32 provides the means for raising the clamps to move the fruit over the sliding blade 1 and over and onto the core loop plate 4 and this slide frame is moved vertically by means of the cam roller 36 riding in the cam groove 15 of the cam cylinder 13. The means are not herein illustrated for moving the splitting blade 1 from the full line position of Figure 1 to the dotted line position therein shown but this means is effected by a similar cam arrangement specifically set forth and described more fully in my aforesaid co-pending application.

The means as herein illustrated for operating the coring knives 7 and 8 and the trimming knives 9 and 10 are also completely and in detail described in my aforesaid application and it is believed sufficient to herein point out that the two knives 7 and 8 are carried upon separate shafts, one of which is indicated at 37 and is adapted to be driven through the medium of its drive gear 38 from a driven pinion 39. The shaft for the other knife 7 is driven by its drive pinion 40 also from the drive pinion 39. The drive pinion 39 also carries separate gear teeth 41 which mesh with the pinion 42 carried by the sleeve 43 which in turn is secured to and drives the trimming knives 9 and 10 as will be apparent from my co-pending application above referred to.

The pinion 39 is driven through the medium of a drive shaft 44 which is releasably coupled to the driving shaft 45. The driving shaft 45 carries at its upper end a pinion 46. This pinion 46 meshes with a gear segment 47 which rotates around a center 48 and is rotated through the medium of the cam roller 49 traveling in the cam groove 17.

As herein illustrated, the means provided for oscillating the movable section 4ᵃ of the coring loop plate 4 include the bracket 50 to which the section 4ᵃ is secured and which bracket also provides a means for connection to the operating shaft 51. The operating shaft 51 extends upwardly and is journaled in a bearing block 52 supported by the coring loop plate assembly. The shaft 51 is releasably coupled through a clutch coupling 53 with an operating shaft 54. The operating shaft 54 has secured to its upper end an operating lever arm 55. The operating lever arm 55 carries at its free end a cam roller 56 which rides within the cam groove 18.

As hereinbefore stated, means are provided for jetting water over the surface of the plates 4 and 4ᵃ and the means for supplying water to this mechanism includes the pipe 57 which connects with a water manifold 58. The water manifold 58 is carried by the turret 59 which revolves around the column 11. The turret 59 also provides the supporting structure for the coring loop assembly, splitting blade assembly, and the clamp assembly as these elements are carried around the column 11 with relation to the stationary cap 12 and stationary cam cylinder 13. The flexible conduit 28 is connected with the end of the pipe 57.

The spindle 29 is coupled to the conduit 28 as indicated at 60 (Figure 3) and extends through the bracket 50 and through the plate section 4ᵃ and is held in position by means of a set screw 61. The spindle 29 is formed with a central port 62 through which the water flows from the conduit 28 and out the spray apertures 30 and 31.

While I have herein illustrated the core loop plate 4 as being formed in two sections which are substantially half sections of the entire plate, it will be obvious to those skilled in the art that this is only a matter of convenience and that the movable section may be formed of any suitable portion of the plate 4ᵃ. The movable section 4ᵃ is as herein illustrated given a very gentle oscillation so that it does not have any tendency to injure the fruit halves but merely pushes the same away from the plate 4 so that any adherence or suction between the fruit halves and the plate or the seed pod sections is broken permitting the fruit halves to fall freely from the machine, free of the seed pod sections which have been severed therefrom.

It will be observed that the core loop plate 4 is provided with a coplanar seed pod supporting plate 4ᵇ which in turn is provided with a central tubular element 65 which is formed as an extension of the similar tubular element 66 of the splitting blade 1. The pear 2 prior to its being gripped by the clamps 3 has been impaled by a stemming tube (not shown) which forms a cylindrical bore 65ᵃ through the pear by which the pear is guided by means of the tubular element 66 of the splitting blade 1 and the tubular element 65 of the seed pod supporting plate 4ᵇ as the pear is moved over the splitting blade 1 and onto position on the core loop plate 4.

By referring to Figures 3, 5 and 6, it will be observed that this tubular section 65 forms in effect a key for the cylindrical bore 65ᵃ of the seed pods. This key acts to hold the halved portions of the seed pods from movement on the seed pod supporting plate 4ᵇ during rotation of the core loop knives 7 and 8 and acts with the core loop knives 7 and 8 to retain the half portions of the seed pod in definite position as the core loop plate section 4ᵃ is oscillated to push the pear halves away from the plate 4 and the held seed pod sections.

Having fully described my invention, it is to be understood that I do not wish to be limited to the details herein set forth, but my invention is of the full scope of the appended claims.

I claim:

1. In an apparatus of the class described, the combination of a plate, coring knives mounted in the plate, means supported by the plate providing keys extending in the seed pods of the fruit, means for supporting fruit halves on the plate, means for rotating the coring knives to cut the seed pods from the fruit halves, means operative to hold the seed pod sections from movement away from the plate and operative in conjunction with the key means to prevent shifting of the seed pod sections with relation to the plate, and means operative while the seed pods are held in position for separating the fruit halves from the plates and from the seed pod sections.

2. In a fruit treating machine, the combination of means to confine a fruit half during a coring operation and thereafter operated to release the cored fruit half, support means for the seed pod portion of the fruit half, means carried by said support arranged to key into the seed pod to prevent transverse movement of the seed pod during the separation of the cored fruit half from the severed pod, and a coring knife operable first to cut the seed pod from the confined fruit half, secondly to prevent longitudinal movement of the seed pod while securely retaining the severed seed pod on said support during the separation of the cored fruit half, and finally operable for releasing the severed seed pod.

3. In a fruit treating machine, the combination of means to confine a fruit half during a coring operation and thereafter operated to release the cored fruit half, support means for the seed pod portion of the confined fruit half, means carried by said support arranged to key into the seed pod to prevent movement across said support in one direction while the cored fruit half is being ejected, means for ejecting the cored fruit half when released by said confining means, and a coring knife operable first to cut the seed pod from the confined fruit half and secondly to prevent movement of the seed pod across said support in a direction different from that of the key means while the cored fruit half is being ejected.

4. In an apparatus for seeding fruit, the combination of an apertured plate having seed section knives positioned within the aperture, means for supporting the fruit halves on the plate with their said sections in register with the aperture, means for rotating the knives to cut the seed sections from the fruit halves, means for rotating the knives to a position to lock the seed sections with relation to the plate, means for releasing the fruit half holding means, and means for actuating a section of the plate in a direction across the plane of contact of the fruit halves with the plate for separating the fruit halves from the plates and the seed sections while the seed sections are locked with reference to the plate, and means for returning the knives to the position to release the seed sections.

5. In an apparatus for seeding fruit, the combination of a contact plate for a seed section, knives normally positioned within the plate, means for supporting fruit halves on the plate with their cut surfaces in contact with the surfaces of the plate and with their seed section in position with relation to the knives, means for rotating the knives to cut the seed sections from the fruit halves and for continuing the rotation of the knives to a position to lock the seed sections in position, means for separating the fruit halves from the plate and seed sections including means operable transversely of the plane surfaces of the plate to engage the plane surfaces of the fruit and separate the fruit halves from the seed sections while the seed sections are locked with reference to the plate, and means for then returning the seed section knives to their starting position to release the seed sections.

6. In an apparatus for seeding fruit, the combination of a plate having seed sections mounted therein, a coring knife, means for supporting a fruit half on the plate with their seed sections in register with the knife, means for rotating the knife to cut the seed section from the fruit half and operable to continue the rotation of the knife to a position to lock the seed section against the plate, means for releasing the fruit half holding means and means for actuating a section of the plate transversely with reference to the cut section of the fruit half to separate the fruit half from the locked seed section, and means for returning the knife to its starting position to release the seed section from the plate.

7. In an apparatus for seeding fruit, the combination of a contact plate against which the plane surface of a half-fruit is adapted to be held, a knife adapted to cut the seed section from the fruit half while it is so held, means for actuating the knife into a position to encompass the seed section cut from the fruit and to hold the same against the surface of the plate after the seed section has been cut from the fruit half, means for releasing the fruit half holding means, and means operable in a direction transverse to the plane section of the half fruit to separate the fruit half from the seed section while the seed section is held with reference to the plate.

GUY A. DUNN.

REFERENCES CITED

The following references are of record in the file of this patent:

UNITED STATES PATENTS

| Number | Name | Date |
|---|---|---|
| 1,605,532 | Duncan | Nov. 2, 1926 |
| 1,785,006 | Duncan | Dec. 16, 1930 |
| 1,785,013 | Havens | Dec. 16, 1930 |
| 1,994,473 | Jones | Mar. 19, 1935 |
| 2,066,567 | Jepson | Jan. 5, 1937 |
| 2,075,750 | Pease | Mar. 30, 1937 |
| 2,242,242 | Ewald | May 20, 1941 |
| 2,309,321 | Jepson | Jan. 26, 1943 |
| 2,327,343 | Ewald | Aug. 24, 1943 |
| 2,343,098 | Thompson | Feb. 29, 1944 |
| 2,376,526 | Thompson | May 22, 1945 |